United States Patent Office 3,352,848
Patented Nov. 14, 1967

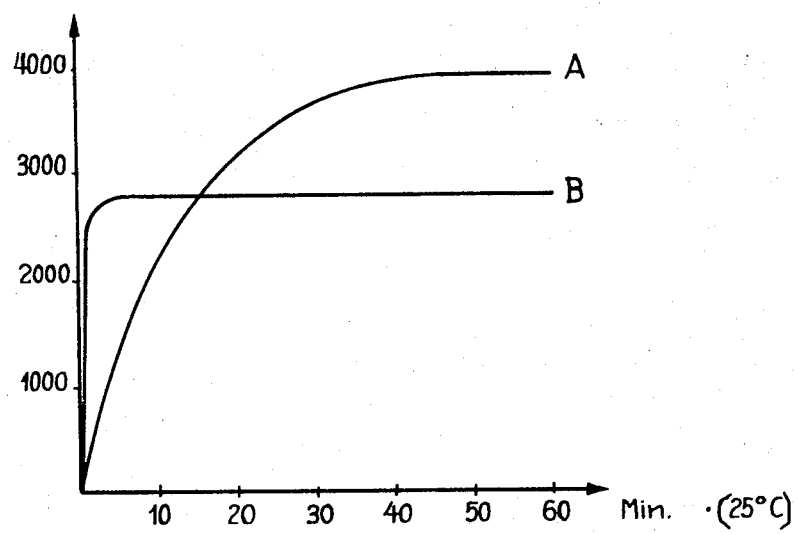

3,352,848
PROCESS FOR THE MODIFICATION
OF POLYSACCHARIDES
Cla Christoffel and Eric A. Borel, Waedenswil, Artur Blumenthal, Zurich, Ulrich Schobinger, Zug, and Karl Mueller, Waedenswil, Switzerland, assignors to Blattmann & Co., Waedenswil, Switzerland, a partnership
Filed Feb. 2, 1965, Ser. No. 429,769
Claims priority, application Switzerland, Feb. 5, 1964, 1,352/64
11 Claims. (Cl. 260—209)

The present invention relates to a process for the preparation of reaction products of polysaccharides with phosphorus compounds and nitrogen compounds.

Starch phosphates have already been produced by heating starch with alkali metal orthophosphates, metaphosphates, pyrophosphates, polymetaphosphates and polyphosphates. The corresponding processes in general must be conducted under such temperature conditions that degradation of the starch and undesirable coloring occurs, even under neutral reaction conditions. Besides a large excess of alkali metal phosphate must be used.

In the processes known up to now for preparing phosphorus substituted starch either the total reaction is carried out in aqueous suspension, or at first the unswollen starch is slurried with an aqueous solution of the phosphorus containing reaction component, e.g. a phosphate, whereafter the pretreated starch is filtered, dried, ground and heated to esterification temperature. A disadvantage of these processes is the necessity of adding the phosphate reactant in form of suspensions, so that an exact dosage is impossible and besides a loss of reactant is always inherent. Besides by this type of processes polysaccharide starting materials which are soluble or swell in cold water, such as glactomannans, alginates, dextrins and the like cannot be used.

According to the present invention it has been found that the reaction of insoluble polysaccharides can be facilitated and the modification of such swelling and soluble polysaccharide materials can be brought about, and further that improved products may be obtained, when the reaction of the polysaccharides starting material and a phosphate reactant is carried out in the presence of certain nitrogen compounds and under exclusion of oxygen, while special pressure conditions are observed during at least part of the process.

In the process of the present invention the pulverulent polysaccharides in natural or pretreated form, and in admixture with phosphorus compounds, especially phosphates, and nitrogen compounds in the form of amines, amides or ammonium compounds, are slowly heated under vacuum to the condensation temperature, whereby the material is dehydrated; then with further increasing temperature the condensation reaction is carried out, by which water is set free. The condensation is effected under exclusion of oxygen; and preferably in this stage as in the first process stage subatmospheric pressures are applied. The condensation may be followed by a thermal degradation if desired, which occurs if the temperature is further raised; the thermal degradation also being carried out under exclusion of oxygen. Upon completion of the desired reaction the reaction product is cooled while still excluding oxygen.

By the term "exclusion of oxygen" in the present specification the substantial absence of oxygen, but not necessarily total absence of oxygen, is to be understood.

Accordingly, the present invention provides a process for the preparation of reaction products of polysaccharides with phosphorus compounds and nitrogen compounds which comprises dehydrating pulverulent polysaccharides in natural or pretreated form, e.g., in partially degraded form if desired, in admixture with phosphorous compounds, such as phosphates and, if desired, phosphoric acid, and with amines, amides or ammonium compounds, by heating the mixture under vacuum, then condensing the resulting mixture under exclusion of oxygen, preferably at subatmospheric pressure, then if desired subjecting the material so obtained to a thermal degradation reaction under exclusion of oxygen, and cooling the reaction product under exclusion of oxygen.

The products so obtained are purer and have better color characteristics than the products of hitherto known processes by which phosphorus is introduced into polysaccharides. Further they yield clearer solutions. Accordingly, they necessitate no subsequent purification or bleaching treatment. Besides, a further advantage may be achieved by the present process in that by control of the pressure during the condensation reaction the degree of substitution of the polysaccharide and the weight proportion of introduced nitrogen to introduced phosphorus in the reaction product may be varied, and as a consequence thereof the viscosity and swelling properties of the end products may be controlled with respect to the intended use of these products.

The products obtained can be used to advantage, e.g., in the following domains: paper industries, textile industries, pharmaceutical and food industries; they further may be used as core binders, additives to adhesives, thickening agents in printing inks and the like.

The starting materials may be polysaccharide such as starches of any kind, e.g., potato starch, rye starch, corn starch, wheat starch, rice starch, sago starch, tapioca starch, milo starch, waxy milo or waxy corn, amylopectin, amylose, galactomannans, traganth, agar-agar, and the like, in natural, pretreated or partially degraded form and in dry to moist state; in any event, the polysaccharide starting material must be pulverulent.

The pretreatment to which the starting materials may be subjected can be a chemical treatment, e.g., hydrolysis or oxidation, a biochemical treatment, e.g., by use of enzymes, a physical treatment, e.g., supersonic treatment, mechanical degradation, milling, radioactive irradiation, or the like.

Suitable phosphates are e.g. primary, secondary and tertiary orthophosphates, pyrophosphates, hypophosphates, metaphosphates, polymetaphosphates and the like; especially suitable is the use of mixtures of different phosphates. The nitrogen providing amines, amides and ammonium compounds may be, e.g., urea, thiourea, monoand polymethylol ureas, formamide, trimethylamine, triethanolamine, hexamethylene tetramine and ammonium compounds, especially alkaline reacting inorganic ammonium compounds, e.g., ammonium carbonate.

The process of the present invention may be carried out in the presence of further reactants, e.g., aldehydes or aldehyde delivering compounds. Further components influencing the modification reaction, such as hydrochloric acid or the like, may be present if desired. The presence of catalysts such as ammonium chloride, aluminum chloride, aluminum sulfate or the like may be advantageous.

In the practice of the present process all reactants are added directly to the pulverulent polysaccharide starting material. The reactants may be liquid or in solution but they preferably are in the solid state. The direct addition of the reactants brings about the advantage that any proportions may be added in exact amounts and that no loss of reactants can occur. It is a further advantage of the process that starting materials which already are soluble or swelling in cold water, such as guar, alignates, white and yellow dextrins, or the like may be modified effectively.

The water content of the pulverulent starting materials may vary within wide ranges. For example, pre-dried starch, i.e. starch having a lower moisture content than commercial starch, can be used, as well as so-called moist starch as it is obtained during manufacture from filter presses, centrifuges, etc. Notwithstanding variations of the moisture contents of the starting materials, similar end products can be consistently obtained by virtue of the adaptability of the present process to special requirements.

The drying or dehydration of the starting materials is carried out under vacuum. This step is continued either until the material contains no more water at all or until the remaining water content is so low that during the subsequent heat treatment no pasting will take place. The condensation reaction following the dehydration preferably is carried out under vacuum; however, it can also be effected in presence of a non-oxidizing, reducing or inert atmosphere, such as $CO_2$, $SO_2$ or nitrogen, at normal or subatmospheric pressures. The reaction product is cooled under similar exclusion of oxygen, either after the condensation reaction or, if desired, after having been heated further under similar exclusion of oxygen to effect a thermal degradation of the material.

All the reactions are carried out with dry to moist pulverulent polysaccharide starting material in a closed and explosion-proof system.

The products obtained according to the present process are more uniform in their quality, degree of substitution and degree of degradation than the nearest products of modification processes hitherto known. Due to the type of the phosphorous- and nitrogen-containing reactants as well as to the proportion in which these reactants are used a wide variety of end products may be obtained.

According to a special feature of the invention, an especially advantageous control of the reaction can be achieved by maintaining a selected subatmospheric pressure during the condensation. It has been found that when using identical proportions of reactants and carrying out the process under identical reaction conditions except as to the magnitude of the subatmospheric pressure, the relation of nitrogen to phosphorus introduced into the polysaccharide during the condensation increases with increasing pressure. The products obtained with different ratios of nitrogen to phosphorus have different swelling characteristics. When using subatmospheric pressures of from about 30 to 90 millimeters Hg products are obtained which when suspended in water gain their maximum viscosity only after a considerable time, of e.g. more than 20 minutes. At higher pressures of about 200 to 500 millimeters Hg, however, products may be obtained which even in cold water attain their maximum viscosity within a few seconds and without any formation of lumps and which retain this viscosity unaltered during several hours.

The accompanying drawing presents a chart illustrative of the effects of different subatmospheric pressures.

The values shown in the chart were obtained with products obtained from the following components (the viscosity was determined with a Brabender-Viscograph VSK 3):

Reactants:
  Potato starch _____ kg__ 100
  Tetrasodium pyrophosphate _____ kg__ 8.5
  Orthophosporic acid,
    85% by weight _____ liters__ 3.5
  Urea _____ kg__ 9

A. Condensation during 1 hour at 140° C., 70 mm. Hg; relation N:P in the product=1:6.4.
B. Condensation during 1 hour at 140° C., 400 mm. Hg; relation N:P in the product=1:4.9.

The following examples which are intended as typical and informative and in no way limiting the invention will further illustrate the disclosed process.

*Example 1*

200 kilograms of commercial potato starch is mixed with 20 kilograms of primary sodium phosphate ($NaH_2PO_4 \cdot 2H_2O$), 44 kg. of secondary sodium phosphate ($Na_2HPO_4 \cdot 12H_2O$) and 8 kilograms of urea. Then the mixture is subjected to a vacuum of 50 mm. Hg and brought to 95° C. within a period of 3 hours with removal of water contained in the starting materials. The resulting material is heated during 3½ hours to 155° C. at 60 to 70 mm. Hg and then is cooled under vacuum.

The reaction product so obtained when suspended in cold water reaches a maximum viscosity after a few seconds. The maximum viscosity of a 5% (by weight) suspension of the modified starch at 25° C. is 8,200 cps. (Brookfield viscosimeter Spindle 3, 20 r.p.m.). After exhaustively washing with alcohol the product has a phosphorous content of 0.31% and a nitrogen content of 0.08%.

*Example 2*

200 kilograms of commercial potato dextrin having a solubility in cold water in excess of 90% and a viscosity of 45 cps. (Hoeppler viscosimeter) in 30% aqueous solution is admixed with 5 kilograms of tertiary sodium phosphate ($Na_3PO_4 \cdot 8H_2O$), 10 kilograms of secondary sodium phosphate ($Na_2HPO_4 \cdot 12H_2O$), 10 kilograms of tetrasodium pyrophosphate ($Na_4P_2O_7 \cdot 10H_2O$) and the 10 kilograms of urea. Then the mixture is gradually heated under a vacuum of 100 mm. Hg to 150° C. in an autoclave provided with a stirrer, whereby water is removed continuously. Then the vacuum is replaced by a nitrogen atmosphere and the material is heated for two hours to 150° C., whereafter it is cooled in nitrogen atmosphere.

The viscosity of a 5% aqueous solution of the product is 800 cps. at 25° C. After washing with alcohol the product contains 1.8% of bound phosphorus and 0.45% of bound nitrogen.

*Example 3*

200 kilograms of commercial potato starch under a vacuum of 70 mm. Hg is impregnated with 100 grams of HCl gas. Under a vacuum of 70 mm. Hg the mixture is slowly heated to 120° C., whereby dehydration occurs. Then the product is heated for 2½ hours to 150° C. at 70 mm. Hg. To the degradation product so obtained 8 kilograms of tertiary sodium phosphate ($Na_3PO_4 \cdot 8H_2O$), 10 kilograms of secondary sodium phosphate $$(Na_2HPO_4 \cdot 12H_2O)$$

10 kilograms of tetrasodium pyrophosphate $$(Na_4P_2O_7 \cdot 10H_2O)$$

and 10 kilograms of urea are added. The reaction mixture then is heated for two hours at 150° C. in a nitrogen atmosphere at a pressure of 460 mm. Hg, whereafter it is cooled under nitrogen.

The viscosity of a 5% aqueous solution of the product at 25° C. is 1900 cps. After washing with alcohol the product contains 2.1% of bound phosphorous and 0.5% of bound nitrogen.

*Example 4*

200 kilograms of waxy-milo starch is admixed with 1.6 kilograms of primary sodium phosphate ($NaH_2PO_4 \cdot 2H_2O$), 4 kilograms of secondary sodium phosphate ($Na_2HPO_4 \cdot 12H_2O$) and 8 kilograms of hexamethylene tetramine; then 15 liters of water are added. In the course of 3 hours the mixture is heated under a vacuum of 60 mm. Hg to 105° C. Then the reaction mixture is heated to 150° C. for four hours while maintaining the vacuum, whereafter it is cooled in an atmosphere of $CO_2$.

The product by gentle heating in water gives a clear solution; the viscosity of the 5% solution at 25° C. is 19,000 cps. Even after repeated freezing the solution remains clear and does not retrograde. After washing with alcohol the product contains 0.51% of bound phosphorus and 0.48% of bound nitrogen.

*Example 5*

300 kilograms of granular wheat starch of 40% moisture content is admixed with 22 kilograms of tetrasodium pyrophosphate ($Na_4P_2O_7 \cdot 10H_2O$), 25 kilograms of urea and 20 liters of 40% (by weight) phosphoric acid. Then the mixture in the course of 3 hours is slowly heated to 95° C. under a vacuum of 70 mm. Hg with stirring and dehydration. The resulting material is heated for two hours at 135° C. and a pressure of 280 mm. Hg, and then is cooled while maintaining the subatmospheric pressure.

When stirred into cold water the product reaches maximum viscosity after about 20 minutes. A 5% aqueous solution has a viscosity of 9,500 cps. at 25° C., which remains unaltered for several hours. After washing with alcohol the product contains 1.9% of bound phosphorus and 0.49% of bound nitrogen.

*Example 6*

To 200 kilograms of commercial potato starch is added a solution made up from 40 liters of water, 10 kilograms of tetrasodium pyrophosphate ($Na_4P_2O_7.10H_2O$), 9 kilograms of ammonium phosphate ($[NH_4]_2HPO_4$), 10 kilograms of 85% phosphoric acid and 10 kilograms of urea. Then a vacuum of 90 mm. Hg is applied and the mixture is brought to 105° C. in the course of 4 hours. During this operation all water is removed. The resulting mixture is heated for 2 hours at 380 mm. Hg to 135° C.

The product obtained after cooling can be dispersed in cold water without formation of lumps; after about 30 minutes a 5% solution attains its maximum viscosity of about 51,800 cps. at 25° C. After washing with alcohol this product contains 2.08% of bound phosphorus and 0.30% of bound nitrogen.

*Example 7*

100 kilograms of locust bean gum (galactomannan) having a water content of 12% is sprayed with a solution made up from 20 liters of water, 5 kilograms of primary sodium phosphate ($NaH_2PO_4.2H_2O$), 5 kilograms of secondary sodium phosphate ($Na_2HPO_4.12H_2O$) and 10 kilograms of urea. The resulting material is subjected to a vacuum of 90 mm. Hg and heated to 98° C. in the course of 4 hours. Thereafter the mixture is heated for 2 hours to 130° C. at 66 mm. Hg and then is cooled under vacuum.

When this product is stirred into cold water in an amount to obtain a 1% solution, the viscosity of the solution at 25° C. after one hour is 1,200 cps. After heating to 90° C. and again cooling to 25° C. the viscosity of the solution is 1620 cps. The corresponding viscosities of the starting material were: initially 85 cps; after heating to 90° C., 1660 cps. Thus, by the treatment according to the present invention the cold water viscosity of the material was raised from 85 to 1200 cps., while the viscosity after heating was nearly the same for the treated material as for the starting material. The end product after washing with alcohol contained 1.35% of bound phosphorus. The nitrogen content was 0.20% after deduction of the nitrogen content of the starting material.

We claim:
1. A process for the preparation of phosphorus and nitrogen containing chemical derivatives of polysaccharides, which comprises dehydrating a pulverulent mass of a high molecular polysaccharide by heating said mass under vacuum until the mass contains so little moisture that no pasting will occur in it in the ensuing treatment; then while excluding oxygen from the dehydrated mass heating it further in the presence of a phosphorus compound condensable with said polysaccharide and being selected from the group consisting of primary, secondary and tertiary orthophosphates, pyrophosphates, hypophosphates, metaphosphates, polymetaphosphates, ortho-, pyro- and metaphosphoric acids and mixtures thereof, and also in the presence of a nitrogen compound condensable with said polysaccharide and being selected from the group consisting of urea, thiourea, mono- and polymethylol ureas, formamide, trimethylamine, triethanolamine, hexamethylene tetramine, alkaline reacting inorganic ammonium compounds, and mixtures thereof, to a temperature sufficient to effect condensation of said phosphorus and nitrogen compounds with said polysaccharide; and thereafter cooling the reaction mass while still excluding oxygen from it, to recover the condensation product in a finely divided form.

2. A process according to claim 1, said heating of the dehydrated mass being continued to a temperature sufficient to degrade said polysaccharide thermally.

3. A process according to claim 1, said dehydrated mass being a mixture of a dehydrated pulverulent polysaccharide with said phosphorus and nitrogen compounds in finely divided solid form.

4. A process according to claim 1, wherein said heating of the dehydrated mass and said cooling, as well as said dehydrating, are carried out under vacuum.

5. A process according to claim 1, said heating to effect condensation being carried out under a vacuum of about 30 to 90 millimeters Hg, whereby a product is obtained which swells slowly in cold water.

6. A process according to claim 1, said heating to effect condensation being carried out under a pressure of about 200 to 500 millimeters Hg absolute, whereby a product is obtained which swells rapidly in cold water.

7. A process according to claim 1, wherein heating of said pulverulent mass of high molecular polysaccharide for dehydrating the latter is effected with said polysaccharide in admixture with said phosphorus and nitrogen compounds.

8. A process according to claim 7, wherein high molecular polysaccharide is a starch product selected from the group consisting of pulverulent starches, amylosses, amylopectins and dextrins.

9. A process according to claim 8, wherein at least an initial period of said further heating is effected under vacuum whereby water of condensation is removed from said mass.

10. A process according to claim 8, said phosphorus compound comprising a mixture of different sodium phosphates and said nitrogen compound comprising urea, and said further heating to a temperature sufficient to effect condensation being effected under vacuum.

11. A process according to claim 7, wherein said high molecular polysaccharide is a galactomannan, and said further heating to a temperature sufficient to effect condensation is under continued vacuum.

References Cited

UNITED STATES PATENTS

| | | | |
|---|---|---|---|
| 3,005,007 | 10/1961 | Fierce et al. | 260—234 |
| 3,228,855 | 1/1966 | Cadmus et al. | 260—209 |
| 3,236,830 | 2/1966 | Schramm et al. | 260—209 |

FOREIGN PATENTS 910,893  11/1962  Great Britain.

OTHER REFERENCES

Golova et al.: "Gidroliznaya i Lesokhimicheskaya Promyshlennost," No. 7, 1961, pp. 1–10 (translation of Russian article).

LEWIS GOTTS, *Primary Examiner.*

J. R. BROWN, *Assistant Examiner.*